(12) United States Patent
Noma

(10) Patent No.: US 11,500,232 B2
(45) Date of Patent: Nov. 15, 2022

(54) VIEW ANGLE CONTROL DEVICE

(71) Applicant: SHARP KABUSHIKI KAISHA, Sakai (JP)

(72) Inventor: Mikihiro Noma, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 425 days.

(21) Appl. No.: 16/586,638

(22) Filed: Sep. 27, 2019

(65) Prior Publication Data

US 2020/0124885 A1  Apr. 23, 2020

Related U.S. Application Data

(60) Provisional application No. 62/748,261, filed on Oct. 19, 2018.

(51) Int. Cl.
*G02F 1/13* (2006.01)
*G02F 1/155* (2006.01)
*G02F 1/163* (2006.01)

(52) U.S. Cl.
CPC ............ *G02F 1/1323* (2013.01); *G02F 1/155* (2013.01); *G02F 1/163* (2013.01)

(58) Field of Classification Search
CPC .... G02F 1/13; G02F 1/1343; G02F 1/133536; G02F 1/1323; G02F 1/155; G02F 1/163; G02F 1/133602; G02F 1/1337; G02F 1/13363; G02F 1/133634; G02B 3/005; G02B 6/122; G02B 6/0048; G02B 27/30; G02B 6/0051; G02B 6/0055

USPC ............ 359/275, 282, 269, 265, 272, 273; 349/12, 33, 84, 117
See application file for complete search history.

(56) References Cited

U.S. PATENT DOCUMENTS

2018/0067345 A1* 3/2018 Tang ..................... G02F 1/1323

FOREIGN PATENT DOCUMENTS

JP       2007-155784 A    6/2007
JP     WO2014084065    *  6/2014 ............... G02F 1/15

OTHER PUBLICATIONS

English translation of JP WO2014084065, machine translated on Oct. 6, 2021. (Year: 2017).*

* cited by examiner

*Primary Examiner* — Jie Lei
(74) *Attorney, Agent, or Firm* — ScienBiziP, P.C.

(57) ABSTRACT

A view angle control device includes light transmission layers that are arranged at intervals and through which light passes, electrochromic layers having light absorption spectrum characteristics according to voltages applied thereto, the electrochromic layers and the light transmission layers being arranged alternately, first electrodes disposed on one side with respect to the electrochromic layers and arranged to be overlapped with the respective electrochromic layers and contacted with the respective electrochromic layers, and a second electrode disposed on an opposite side from the first electrodes with respect to the electrochromic layers and arranged to be overlapped with and contacted with the electrochromic layers.

24 Claims, 13 Drawing Sheets

VIEW ANGLE CONTROL DEVICE

CROSS REFERENCE TO RELATED APPLICATION

This application claims priority from U.S. Provisional Patent Application No. 62/748,261 filed on Oct. 19, 2018. The entire contents of the priority application are incorporated herein by reference.

TECHNICAL FIELD

The technology described herein relates to a view angle control device.

BACKGROUND ART

A liquid crystal display device including a view angle control component has been known and one example thereof is described in Japanese Patent No. 4774957. The liquid crystal display device includes a view angle control component between a liquid crystal display element and a surface light source arranged on the opposite side from its observation side. The view angle control component includes a layered structure in which transparent layers and electrochromic layers are arranged alternately in parallel to a surface of the liquid crystal display element. The view angle control component is formed in a film shape having an incident/outgoing surface parallel to the surface of the liquid crystal display element. The view angle control component includes a pair of electrodes at both ends thereof in a direction orthogonal to the layered direction, and the electrodes are provided for supplying electric power to the electrochromic layers. The view angle control component is arranged so that interfaces between the transparent layers and electrochromic layers are disposed substantially in parallel to the normal direction of the liquid crystal display element.

The view angle control component is configured to control a view angle when the pair of electrodes are supplied with electric power; however, the view angle control component does not control the view angle if the pair of electrodes are supplied with no power. Namely, the view angle control component is configured to either control the view angle or not. Therefore, the view angel control component does not have any variation in controlling the view angle and cannot adjust the view angle.

SUMMARY

The technology described herein was made in view of the above circumstances. An object is to increase variation in controlling a view angle.

A view angle control device according to the technology described herein includes light transmission layers that are arranged at intervals and through which light passes, electrochromic layers having light absorption spectrum characteristics according to voltages applied thereto, the electrochromic layers and the light transmission layers being arranged alternately, first electrodes disposed on one side with respect to the electrochromic layers and arranged to be overlapped with the respective electrochromic layers and contacted with the respective electrochromic layers, and a second electrode disposed on an opposite side from the first electrodes with respect to the electrochromic layers and arranged to be overlapped with and contacted with the electrochromic layers.

According to the technology described herein, variation in controlling a view angle can be increased.

DETAILED DESCRIPTION

First Embodiment

Figure 1:
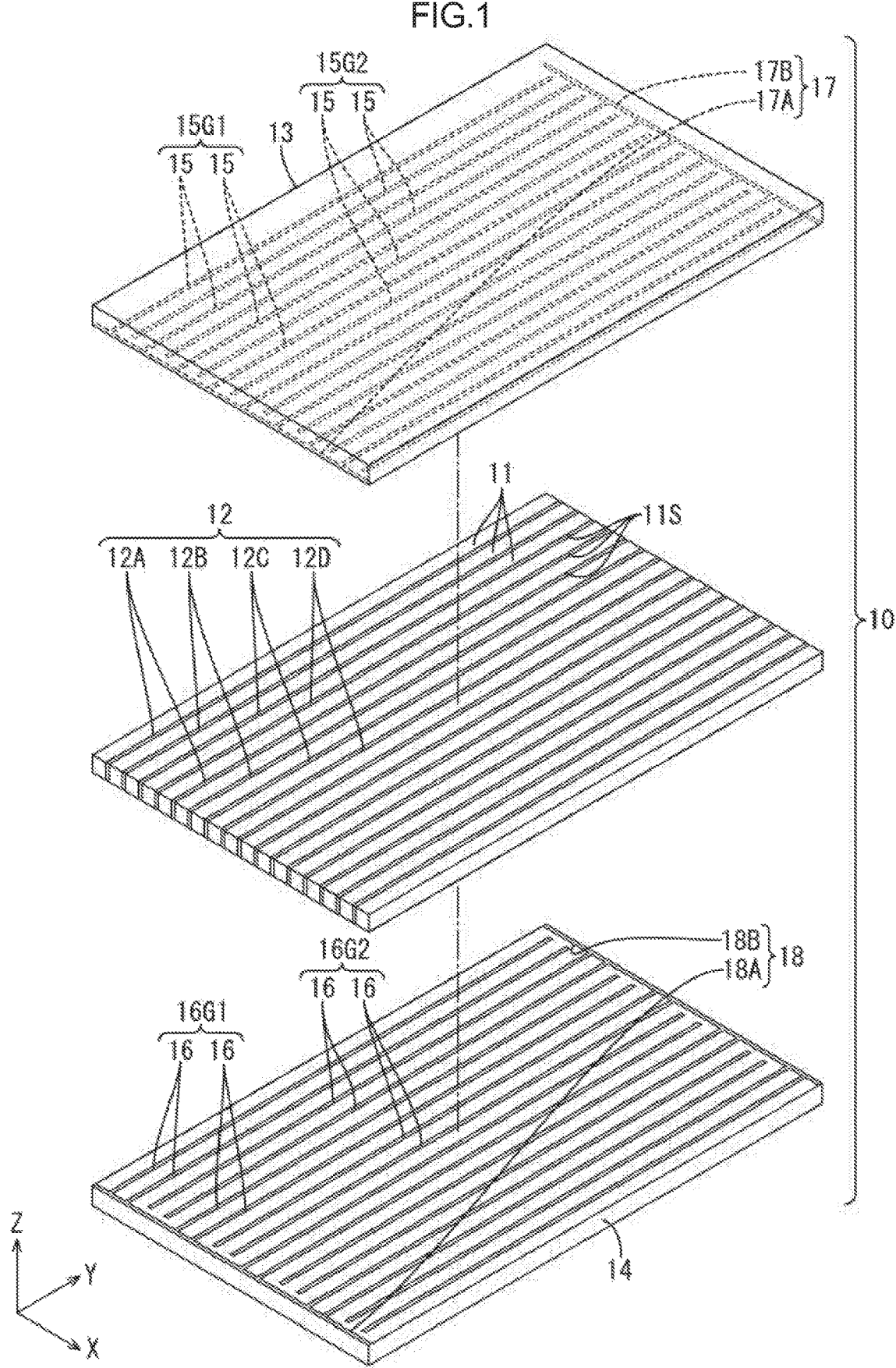
FIG. 1 is an exploded view of a view angle control sheet according to a first embodiment.

A first embodiment will be described with reference to FIGS. 1 to 10. In this embodiment section, (a view angle control device) 10 will be described. X-axes, Y-axes, and Z-axes may be present in the drawings. The axes in each drawing correspond to the respective axes in other drawings. An upper side and a lower side in FIGS. 1 and 5 to 8 correspond to a front side and a back side, respectively.

The view angle control sheet 10 is used in combination with a display device that displays an image so that an angle range in which the image displayed on the display device can be seen, that is, a view angle can be controlled. For example, the view angle control sheet 10 may be used in combination with a liquid crystal display device that includes a liquid crystal panel as a display panel. In such a configuration, the view angle control sheet 10 is preferably arranged between the liquid crystal panel and a backlight unit that supplies light to the liquid crystal panel for displaying. Other than such a configuration, the view angle control sheet 10 may be arranged on the liquid crystal panel on an opposite side from the backlight unit side. The view angle control sheet 10 may be used in combination with an organic EL display device that includes an organic EL display panel as the display panel. In such a configuration, the view angle control sheet 10 is preferably arranged on the organic EL panel on a light exit side (on a user's side). Other than the above configurations, a specific type of a display device that may be combined with the view angle control sheet 10 may be altered as appropriate.

As illustrated in FIG. 1, the view angle control sheet 10 has a vertically elongated square overall shape. A long side direction and a short side direction of the view angle control sheet 10 match the Y-axis direction (a first direction) and the X-axis direction (a second direction) in each drawing, respectively, and a thickness direction thereof matches the Z-axis direction. The view angle control sheet 10 includes light transmission layers 11 through which light passes, electrochromic layers 12 that have light absorption spectrum characteristics according to voltages applied thereto, and a pair of substrates 13, 14 that sandwich the light transmission layers 11 and the electrochromic layers 12 therebetween. The pair of substrates 13, 14 are made of substantially transparent material of glass material or synthetic resin material such as PET or TAC and are formed in a plate form or a film form that has substantially flat plate surfaces on front and back surfaces. In the present embodiment, out of the substrates 13, 14, one on the front side is a first substrate 13 and another one on the back side is a second substrate 14.

Figure 2:
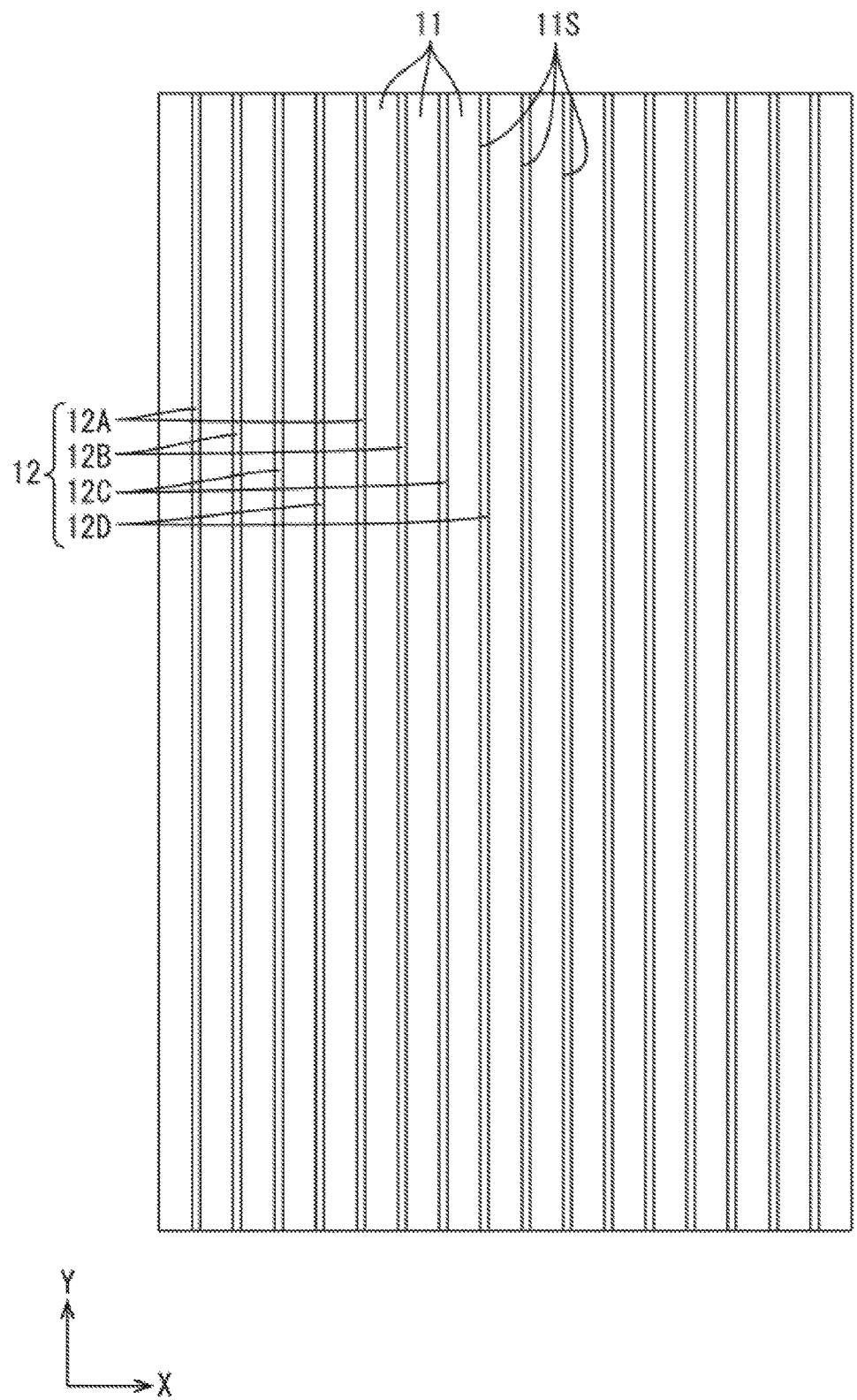
FIG. 2 is a plan view illustrating light transmission layers and electrochromic layers included in the view angle control sheet.

The light transmission layers 11 are made of substantially transparent synthetic resin material such as acrylic resin material or epoxy resin material, and a thickness of each light transmission layer 11 is about 20 μm to 100 μm, for example. As illustrated in FIGS. 1 and 2, each of the light transmission layers 11 has a vertically elongated square columnar shape that extends in the Y-axis direction (an extending direction) and the light transmission layers 11 are arranged in the X-axis direction (an arrangement direction) at predetermined intervals so as to be in planar arrangement. The light transmission layer 11 has a length dimension (a dimension in the extending direction) that substantially matches a long-side dimension of the view angle control sheet 10 and has a width dimension (a dimension in the arrangement direction) that is smaller than a short-side dimension of the view angle control sheet 10 and is about 40 μm, for example. The light transmission layers 11 having such a configuration are formed by applying melted synthetic resin material over a plate surface of one of the pair of substrates 13, 14 in a solid manner and subsequently forming grooves 11S in vertically elongated stripes in a plan view. Therefore, a space that has a width dimension of the groove 11S is between the light transmission layers 11 that are next to each other in the X-axis direction. The light transmission layers 11 and the grooves 11A are arranged alternately in the X-axis direction. All of the grooves 11S have a substantially same width dimension.

The electrochromic layers 12 are made of electrochromic material such as prussian blue or tungsten oxide. The electrochromic material used for the electrochromic layers 12 varies its optical characteristics such as optical absorptance and optical transmittance according to applied voltage. In the present embodiment, the electrochromic layers 12 have light absorption spectrum characteristics such that the optical absorptance is increased and the optical transmittance is lowered when a voltage is applied and power is supplied compared to a case when no voltage is applied and no power is supplied. Specifically, the electrochromic layers 12 according to the present embodiment are substantially transparent and are less likely to absorb light and the light is transmitted therethrough when no power is supplied thereto, and the electrochromic layers 12 exert a dark color such as black due to an oxidation-reduction reaction and absorb most of the light rays and block the light when power is supplied thereto. A potential difference of about from 2V to 5V is necessary for shifting a state of the electrochromic layers 12 from a light transmissive state to a light blocking state.

As illustrated in FIGS. 1 and 2, the electrochromic layers 12 are formed to fill spaces within the grooves 11S between the light transmission layers 11 and are included at a same layer level as the light transmission layers 11. The electrochromic layers 12 extend in the Y-axis direction and are arranged at intervals in the X-axis direction. The electrochromic layers 12 are formed in vertically elongated stripes along the grooves 11S and are disposed to define each of the light transmission layers 11 that are adjacent to each other in the X-axis direction. Therefore, the light transmission layers 11 and the electrochromic layers 12 are arranged alternately in the X-axis direction. An interval between the adjacent electrochromic layers 12 in the X-axis direction substantially matches a width dimension of the light transmission layer 11. The number of the electrochromic layers 12 is same as the number of the grooves 11S and is a number that is obtained by subtracting one from the arrangement number of the light transmission layers 11. In the present embodiment, the number of the electrochromic layers 12 is sixteen. The electrochromic layers 12 having such a configuration is formed by filling spaces within the grooves 11S between the light transmission layers 11, which are formed on one of the pair of substrates 13, 14, with solvent including the electrochromic material. A length dimension (a dimension extending in the extending direction) of the electrochromic layers 12 substantially matches a long side dimension of the view angle control sheet 10 and a width dimension (a dimension extending in the arrangement direction) thereof substantially matches the width dimension of the grooves 11S. A specific width dimension of each electrochromic layer 12 is about 10 μm, for example; however, it is preferably from about 1 μm to 2 μm in view of light blocking properties that are exerted when power is supplied thereto.

As illustrated in FIG. 1, a first electrode 15 and a second electrode 16 for applying voltages to the electrochromic layers 12, which are held between the pair of substrates 13, 14, are formed on the substrates 13, 14, respectively. The first electrode 15 is formed on an inner side plate surface (opposite the electrochromic layers 12 and the light transmission layers 11) of the first substrate 13 and is disposed on a front side (one side) with respect to the electrochromic layers 12 and the light transmission layers 11. The second electrode 16 is formed on an inner side plate surface of the second substrate 14 and is disposed on a back side with respect to the electrochromic layers 12 and the light transmission layers 11, that is, on an opposite side from the first electrode 15. The first electrode 15 and the second electrode 16 are preferably made of transparent electrode material such as indium tin oxide (ITO) and indium zinc oxide (IZO), for example, to keep good light transmissivity. Other than that, opaque metal material such as silver may be used as the material for the first electrode 15 and the second electrode 16, and in such a configuration, the opaque material may be formed in a quite thin film of from about 20 nm to 30 nm to keep a certain degree of light transmissivity. With such a configuration that the first electrode 15 and the second electrode 16 are made of the opaque metal material, the light transmittance of the view angle control sheet 10 becomes uniform within a plane area thereof in each of the light transmissive state and the light blocking state of the electrochromic layers 12.

Figure 3:
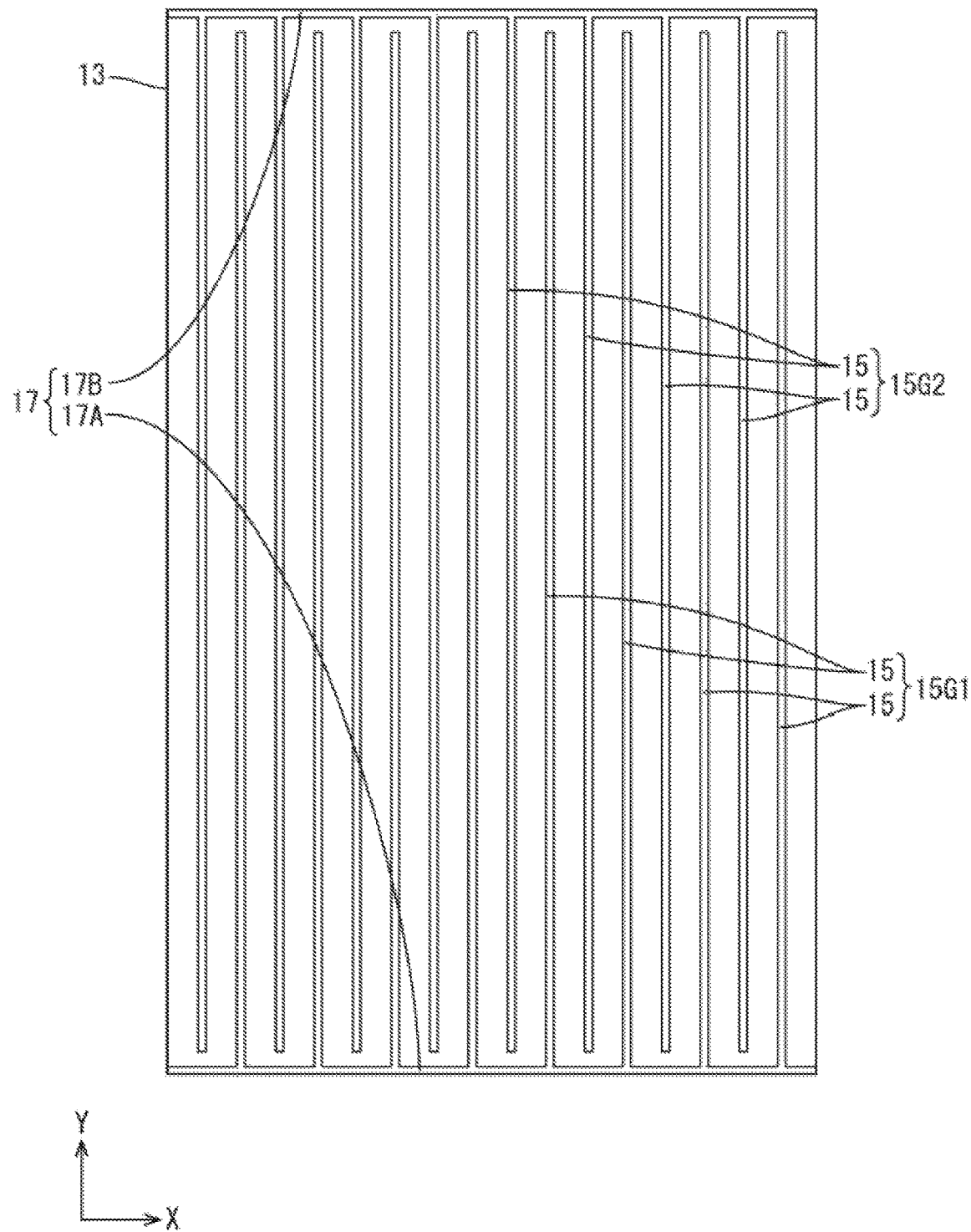
FIG. 3 is a bottom view of a first substrate of the view angle control sheet.

As illustrated in FIG. 3, the first electrodes 15 extend in the Y-axis direction on the first substrate 13 and are arranged at intervals in the X-axis direction. In the present embodiment, the arrangement number of the first electrodes 15 in the X-axis direction is sixteen. The interval between the adjacent first electrodes 15 in the X-axis direction substantially matches the width dimension of the light transmission layer 11. In the present embodiment, the first electrodes 15 are defined into two groups of first electrode groups 15G1 and 15G2 each of which include multiple first electrodes 15. First electrode connecting sections 17 are formed on the first substrate 13 and connect the first electrodes 15 that are included in the two groups of the first electrode groups 15G1 and 15G2, respectively, to short-circuit the first electrodes 15 in each group. The number of the first electrodes 15 that are connected to each first electrode connecting section 17, that is, the number of the first electrodes 15 included in each of the two groups of the first electrode groups 15G1, 15G2 is same (eight). Hereinafter, to define each of the first electrode connecting sections 17, one of the first electrode connecting sections 17 that is connected to the first electrodes 15 included in one (first) first electrode group 15G1 is provided with the numeral with a suffix "A", and another one of the first electrode connecting sections 17 that is connected to the first electrodes 15 included in another one (second) first electrode group 15G2 is provided with the numeral with a suffix "B". No suffix is added to the numeral to generally describe the first electrode connecting sections 17.

As illustrated in FIG. 3, the one first electrode connecting section 17A is disposed on one edge (on a lower side in FIG. 3) of the first substrate 13 with respect to the Y-axis direction and extends in the X-axis direction. The one first electrode connecting section 17A is continuous to each of one end portions of the first electrodes 15 included in the one first electrode group 15G1 with respect to the Y-axis direction. Among the first electrodes 15 that are arranged in the X-axis direction, the one first electrode connecting section 17A is selectively connected to the odd-numbered first electrodes 15 from a right side (one side) with respect to the X-axis direction (the arrangement direction) in FIG. 3. Namely, eight first electrodes 15 that are the odd-numbered ones with respect to the X-axis direction in FIG. 3 are included in the one first electrode group 15G1 and are configured to be collectively supplied with power according to the power supply to the one first electrode connecting section 17A. The other first electrode connecting section 17B is disposed on another edge (on an upper side in FIG. 3) of the first substrate 13 with respect to the Y-axis direction and extends in the X-axis direction. The other first electrode connecting section 17B is continuous to each of another end portions of the first electrodes 15 included in the other first electrode group 15G2 with respect to the Y-axis direction. Among the first electrodes 15 that are arranged in the X-axis direction, the other first electrode connecting section 17B is selectively connected to the even-numbered first electrodes 15 from the right side with respect to the X-axis direction in FIG. 3. Namely, eight first electrodes 15 that are the even-numbered ones with respect to the X-axis direction in FIG. 3 are included in the other first electrode group 15G2 and are configured to be collectively supplied with power according to the power supply to the other first electrode connecting section 17B. Thus, the two first electrode connecting sections 17 are connected to the first electrodes 15 such that the first electrodes 15 included in the one first electrode group 15G1 and the first electrodes 15 included in the other first electrode group 15G2 are arranged alternately.

Figure 4:
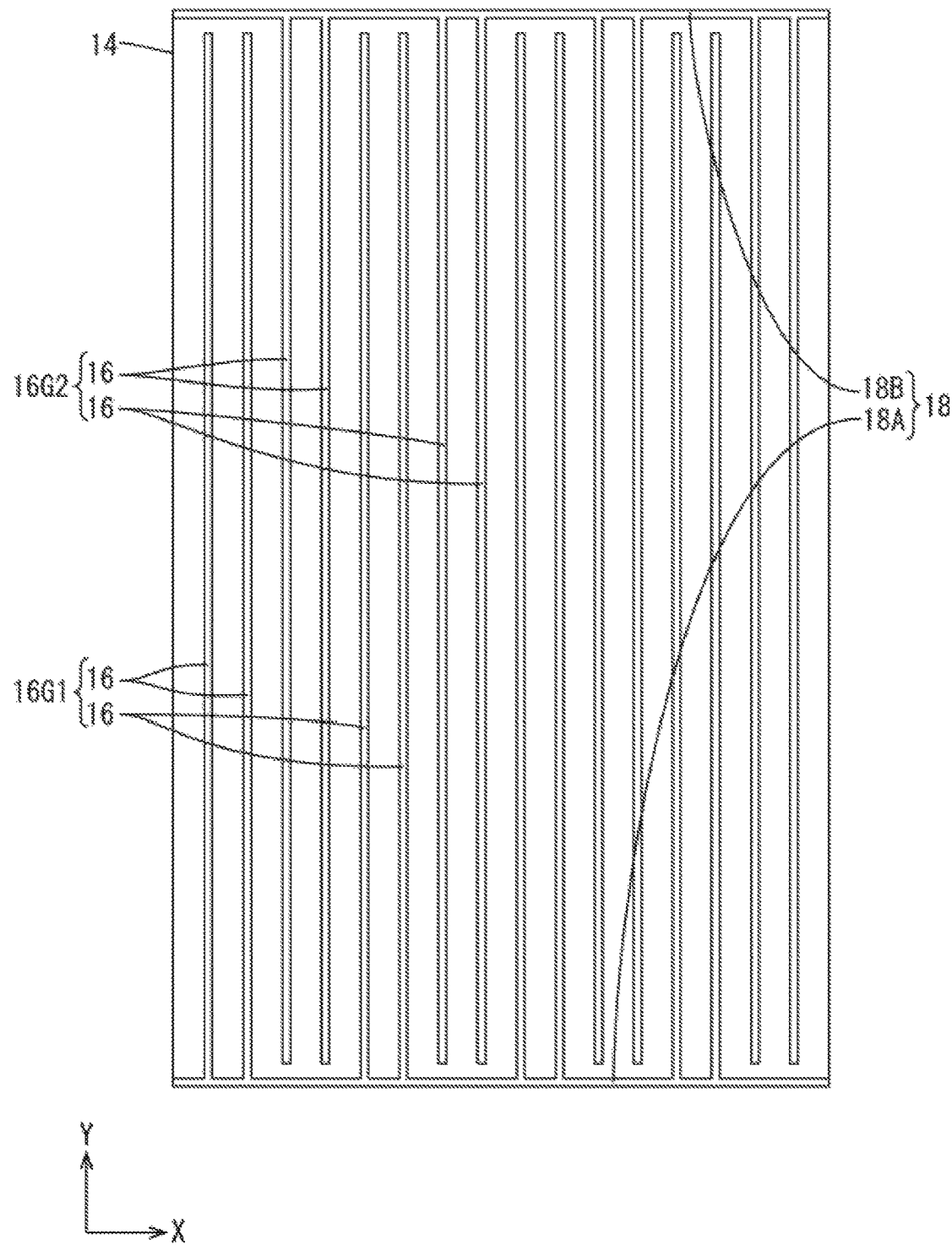
FIG. 4 is a plan view of a second substrate of the view angle control sheet.

As illustrated in FIG. 4, the second electrodes 16 extend in the Y-axis direction on the second substrate 14 and are arranged at intervals in the X-axis direction. The number of the second electrodes 16 is same as that of the first electrodes 15. The interval between the adjacent second electrodes 16 in the X-axis direction substantially matches the width dimension of the light transmission layer 11 or the interval between the adjacent first electrodes 15. In the present embodiment, the second electrodes 16 are included in one of two groups of second electrode groups 16G1 and 16G2. Two second electrode connecting sections 18 are formed on the second substrate 14 and are connected to the second electrodes 16 that are included in the two groups of the second electrode groups 16G1 and 16G2, respectively, to short-circuit the second electrodes 16 in each group. The number of the second electrodes 16 that are connected to each second electrode connecting section 18, that is, the number of the second electrodes 16 included in each of the two groups of the second electrode groups 16G1, 16G2 is same (eight). Hereinafter, to define each of the second electrode connecting sections 18, one of the second electrode connecting sections 18 that is connected to the second electrodes 16 included in one (first) second electrode group 16G1 is provided with the numeral with a suffix "A", and another one of the second electrode connecting sections 18 that is connected to the second electrodes 16 included in another (second) second electrode group 16G2 is provided with the numeral with a suffix "B". No suffix is added to the numeral to generally describe the second electrode connecting sections 18.

As illustrated in FIG. 4, the one second electrode connecting section 18A is disposed on one edge (on a lower side in FIG. 4) of the second substrate 14 with respect to the Y-axis direction and extends in the X-axis direction. The one second electrode connecting section 18A is continuous to each of one end portions of the second electrodes 16 included in the one second electrode group 16G1 with respect to the Y-axis direction. The one second electrode connecting section 18A is selectively connected to following ones of the second electrodes 16 that are arranged in the X-axis direction. When "n" is zero or a positive integer, the one second electrode connecting section 18A is selectively connected to the "4n+1"th second electrodes 16 and the "4n+2"th second electrodes 16 from a left side in the X-axis direction in FIG. 4. Namely, the eight second electrodes 16 that are on the "4n+1"th ones and on the "4n+2"th ones from the left side in the X-axis direction in FIG. 4 are included in the one second electrode group 16G1 and are collectively supplied with power according to the supply of power to the one second electrode connecting section 18A. The other second electrode connecting section 18B is disposed on another edge (on an upper side in FIG. 4) of the second substrate 14 with respect to the Y-axis direction and extends in the X-axis direction. The other second electrode connecting section 18B is continuous to each of another end portions of the second electrodes 16 included in the other second electrode group 16G2 with respect to the Y-axis direction. The other second electrode connecting section 18B is selectively connected to following ones of the second electrodes 16 that are arranged in the X-axis direction. When "n" is zero or a positive integer, the other second electrode connecting section 18B is selectively connected to the "4n+3"th second electrodes 16 and the "4n+4"th second electrodes 16 from the left side in the X-axis direction in FIG. 4. Namely, the eight second electrodes 16 that are on the "4n+3"th ones and on the "4n+4"th ones from the left side in the X-axis direction in FIG. 4 are included in the other second electrode group 16G2 and are collectively supplied with power according to the supply of power to the other second electrode connecting section 18B. Thus, the two second electrode connecting sections 18 are connected to the second electrodes 16 such that every two of the second electrodes 16 included in the one second electrode group 16G1 and every two of the second electrodes 16 included in the other second electrode group 16G2 are arranged alternately. Therefore, the two second electrode connecting sections 18B are connected to the second electrodes 16 with a periodic pattern different from that of the two first electrode connecting sections 17A that are connected to the first electrodes 15.

Figure 5:
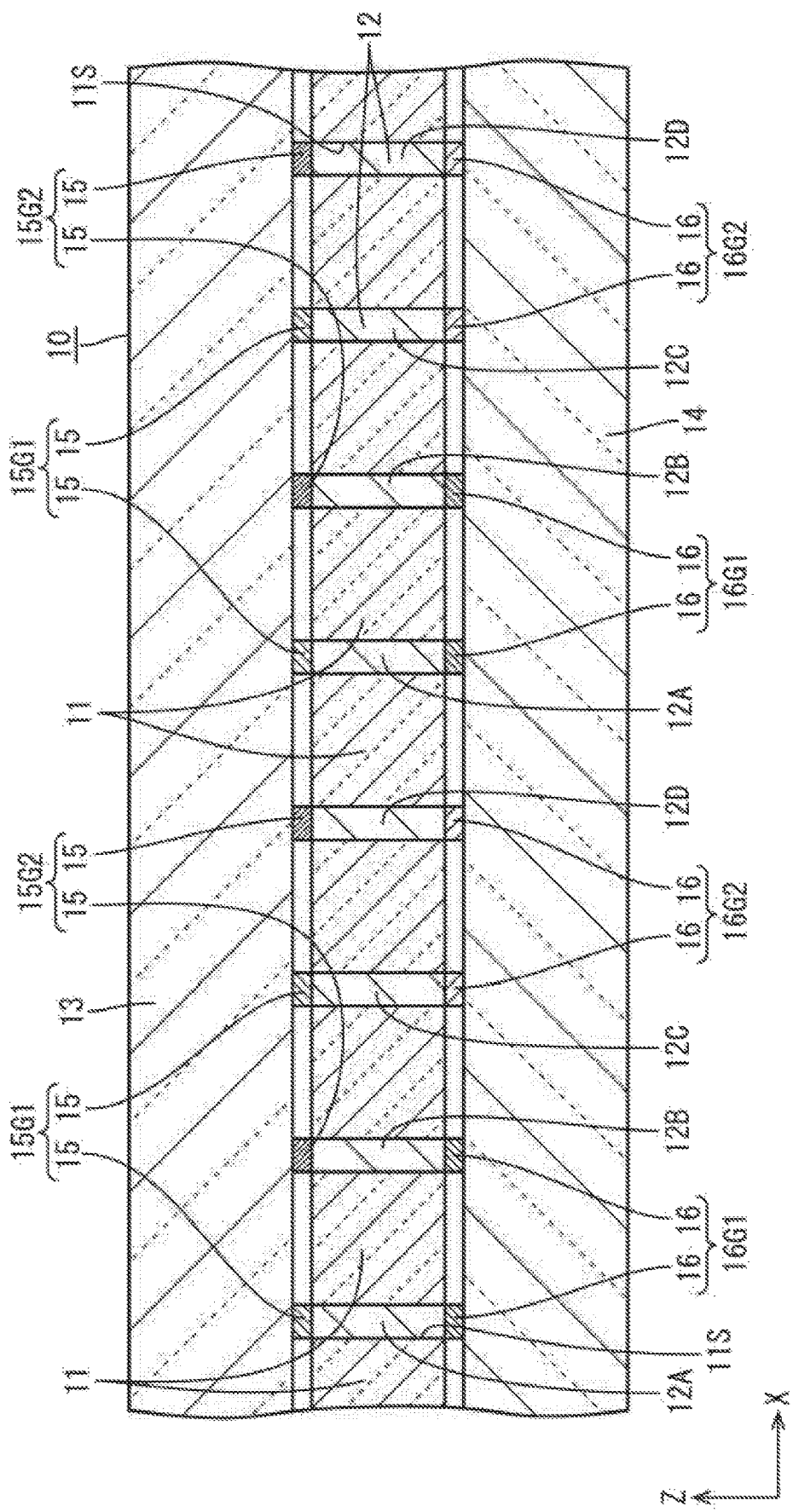
FIG. 5 is a cross-sectional view of the view angle control sheet.

As illustrated in FIG. 5, the first electrodes 15 overlap the electrochromic layers 12, respectively, and are contacted with front surfaces of the electrochromic layers 12. Each of the first electrodes 15 has a width dimension that is equal to a width dimension of the electrochromic layer 12 and is contacted with the electrochromic layer 12 over an entire width surface thereof. The second electrodes 16 overlap the electrochromic layers 12, respectively, and are contacted with back surfaces of the electrochromic layers 12. Each of the second electrodes 16 has a width dimension that is equal to the width dimension of the electrochromic layer 12 and is contacted with the electrochromic layer 12 over an entire width surface thereof. Accordingly, the electrochromic layers 12 are sandwiched between the front side first electrodes 15 and the rear side second electrodes 16 and are contacted with the electrodes 15, 16. According to such a configuration, the electrochromic layers 12 exert black due to an oxidation-reduction reaction caused by potential difference created between the first and second electrodes 15, 16 according to the power supply to the first electrodes 15 and the second electrodes 16 that sandwich the electrochromic layers 12. Thus, the electrochromic layers 12 become in the light blocking state. If at least one of the first electrodes 15 and the second electrodes 16 that sandwich the electrochromic layers 12 is supplied with no power, the oxidation-reduction reaction is not caused and the light blocking state is maintained.

More specifically, as illustrated in FIG. 5, the electrochromic layers 12 include four types of electrochromic layers 12 that are sandwiched between each of the two types of the first electrodes 15 and two types of the second electrodes 16 included in each of the first electrode groups 15G1, 15G2 and each of the two second electrode groups 16G1, 16G2. More in detail, the electrochromic layers 12 include a first electrochromic layer 12A that is sandwiched between the first electrode 15 included in the one first electrode group 15G1 and the second electrode 16 included in the one second electrode group 16G1. The electrochromic layers 12 include a second electrochromic layer 12B that is sandwiched between the first electrode 15 included in the other first electrode group 15G2 and the second electrode 16 included in the one second electrode group 16G1. The electrochromic layers 12 include a third electrochromic layer 12C that is sandwiched between the first electrode 15 included in the one first electrode group 15G1 and the second electrode 16 included in the other second electrode group 16G2. The electrochromic layers 12 include a fourth electrochromic layer 12D that is sandwiched between the first electrode 15 included in the other first electrode group 15G2 and the second electrode 16 included in the other second electrode group 16G2. Accordingly, the electrochromic layers 12 that are arranged in the X-axis direction include the first electrochromic layer 12A, the second electrochromic layer 12B, the third electrochromic layer 12C, and the fourth electrochromic layer 12D that are arranged in this sequence repeatedly from the left side in the X-axis direction in FIG. 5.

The view angle control sheet 10 according to the present embodiment has the above configuration. Next, operations of the view angle control sheet 10 used in combination with a display device will be described with reference to FIGS. 6 to 9. FIGS. 6 to 9 illustrate plan views illustrating portions of the light transmission layers 11 and the electrochromic layers 12 of the view angle control sheet 10. In FIGS. 6 to 9, those of the first electrochromic layer 12A to the fourth electrochromic layer 12D that are in the light blocking state are illustrated with shading.

Figure 6:
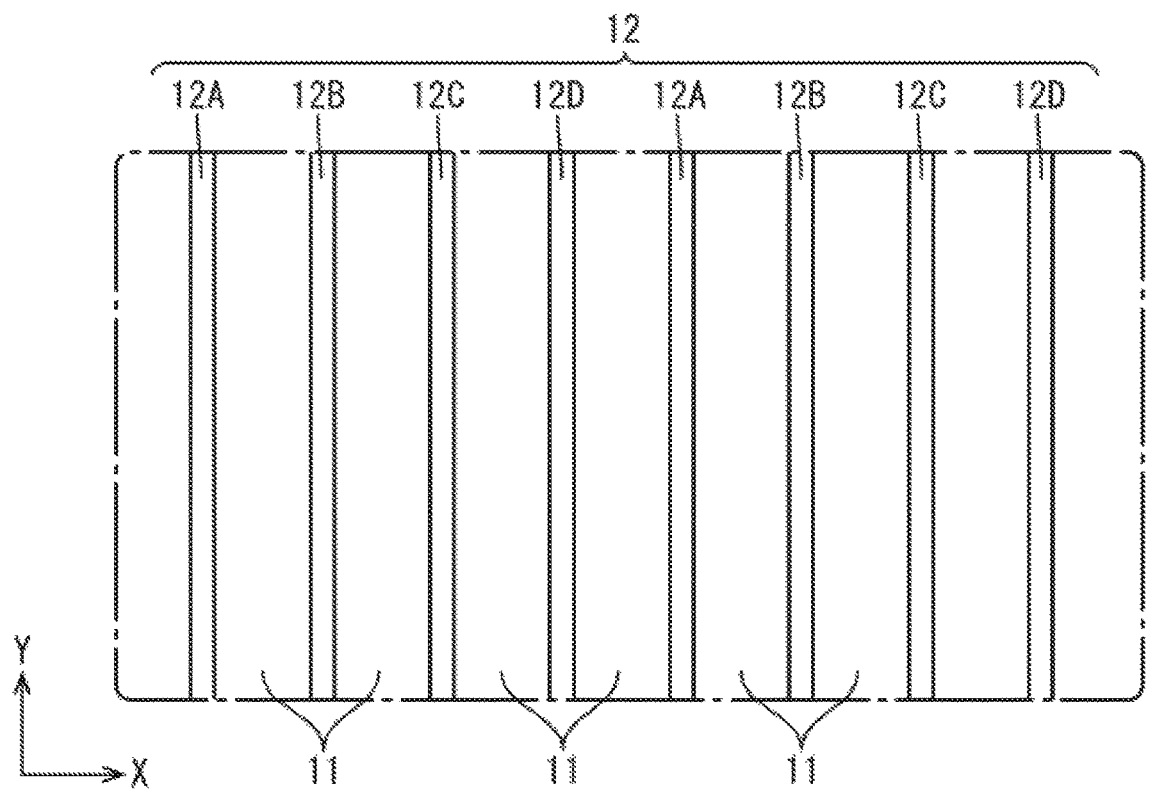
FIG. 6 is a plan view illustrating a portion of the light transmission layers and the electrochromic layers in which entire areas of the electrochromic layers are in a light transmssive state.

First, when each of the electrode connecting sections 17, 18 is supplied with no power, each of the electrodes 15 to 18 is supplied with no power. In this state, no voltage is applied to the electrochromic layers 12 and the oxidation-reduction reaction is not caused, and all of the electrochromic layers 12 are in the light transmissive state, as illustrated in FIG. 6. When the electrochromic layers 12 are in the light transmissive state, an incident angle of light passing through the light transmission layers 11 with respect to the plate surface of the view angle control sheet 10 is not limited in the X-axis direction. Therefore, a user can see an image displayed on the display device without being affected by any restriction of the view angle in the X-axis direction.

Figure 7:
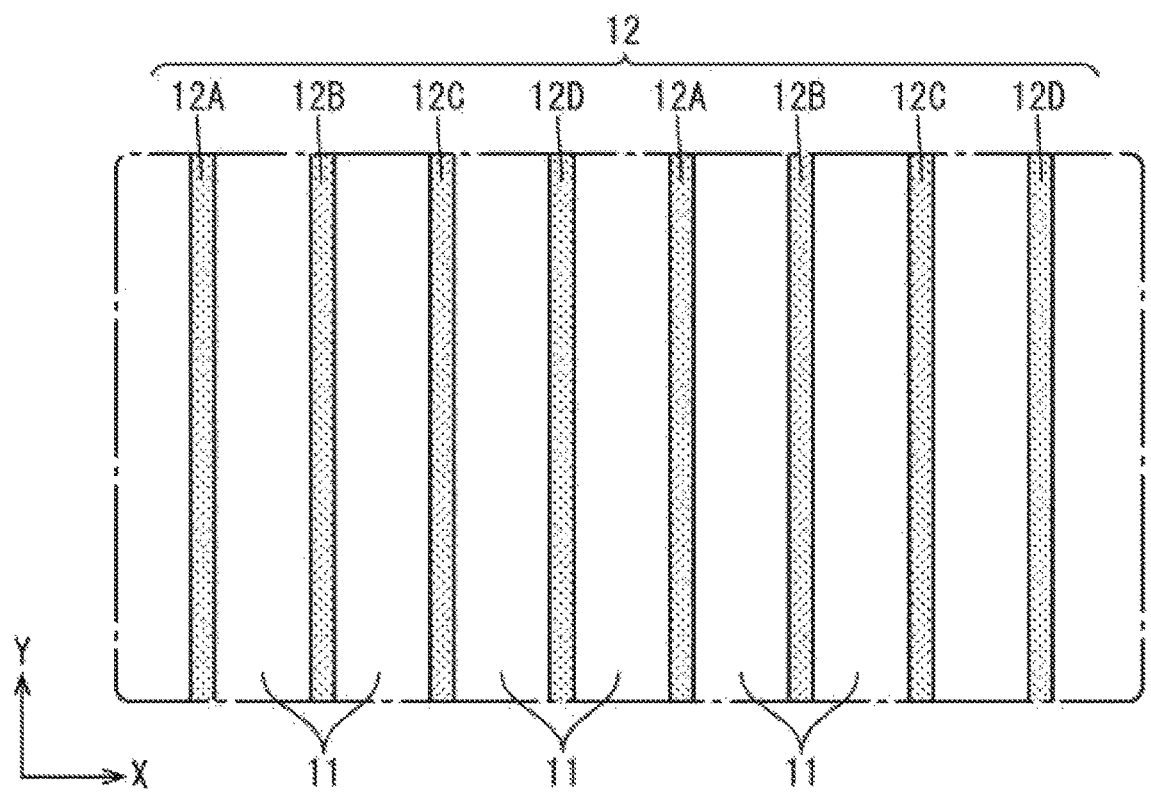
FIG. 7 is a plan view illustrating a portion of the light transmission layers and the electrochromic layers in which entire areas of the electrochromic layers are in a light blocking state.

On the other hand, when each of the electrode connecting sections 17, 18 is supplied with power, the electrodes 15, 16 are supplied with power. In this state, voltage is applied to all of the electrochromic layers 12 and the oxidation-reduction reaction is caused, and all of the electrochromic layers 12 are in the light blocking state, as illustrated in FIG. 7. When all of the electrochromic layers 12 are in the light blocking state, the incident angle of light passing through the light transmission layers 11 with respect to the plate surface of the view angle control sheet 10 is limited to a maximum degree in the X-axis direction. Therefore, a user sees an image displayed on the display device while the view angle in the X-axis direction being limited to the maximum degree.

Figure 8:
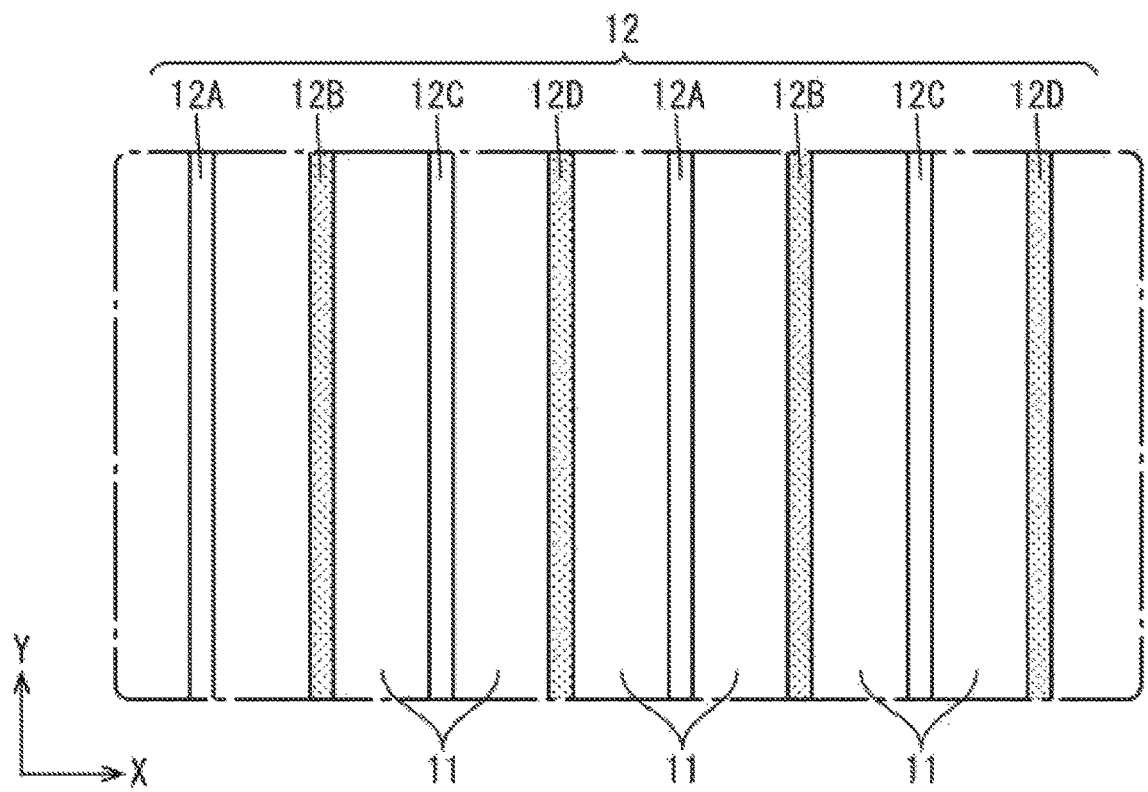
FIG. 8 is a plan view illustrating a portion of the light transmission layers and the electrochromic layers in which second electrochromic layers and fourth electrochromic layers are in the light blocking state.

Next, when the one first electrode connecting section 17A is supplied with no power and other electrode connecting sections 17B, 18A, 18B are supplied with power, the first electrodes 15 included in the other first electrode group 15G2 and all of the second electrodes 16 are supplied with power. In this state, among the electrochromic layers 12, voltage is applied to the second electrochromic layers 12B and the fourth electrochromic layers 12D and therefore, the oxidation-reduction reaction is caused and the second electrochromic layers 12B and the fourth electrochromic layers 12D are in the light blocking state, as illustrated in FIG. 8. Among the electrochromic layers 12, voltage is not applied to the first electrochromic layers 12A and the third electrochromic layers 12C and therefore, the oxidation-reduction reaction is not caused and the first electrochromic layers 12A and the third electrochromic layers 12C are in the light transmissive state. Namely, the electrochromic layers 12 that are in the light blocking state and those in the light transmissive state are alternately arranged and the electrochromic layer 12A, 12C that is in the light transmissive state is disposed between the two electrochromic layers 12B and 12D that are in the light blocking state. If the second electrochromic layers 12B and the fourth electrochromic layers 12D are selectively in the light blocking state, light is allowed to pass through an area including two light transmission layers 11 between the second electrochromic layer 12B and the fourth electrochromic layer 12D, and the first electrochromic layer 12A or the third electrochromic layer 12C that is between the two light transmission layers 11. Therefore, compared to the configuration that all of the electrochromic layers 12 are in the light blocking state as illustrated in FIG. 7, the number of the electrochromic layers 12 that are in the light blocking state is a half and the view angle with respect to the X-axis direction becomes greater.

Figure 9:
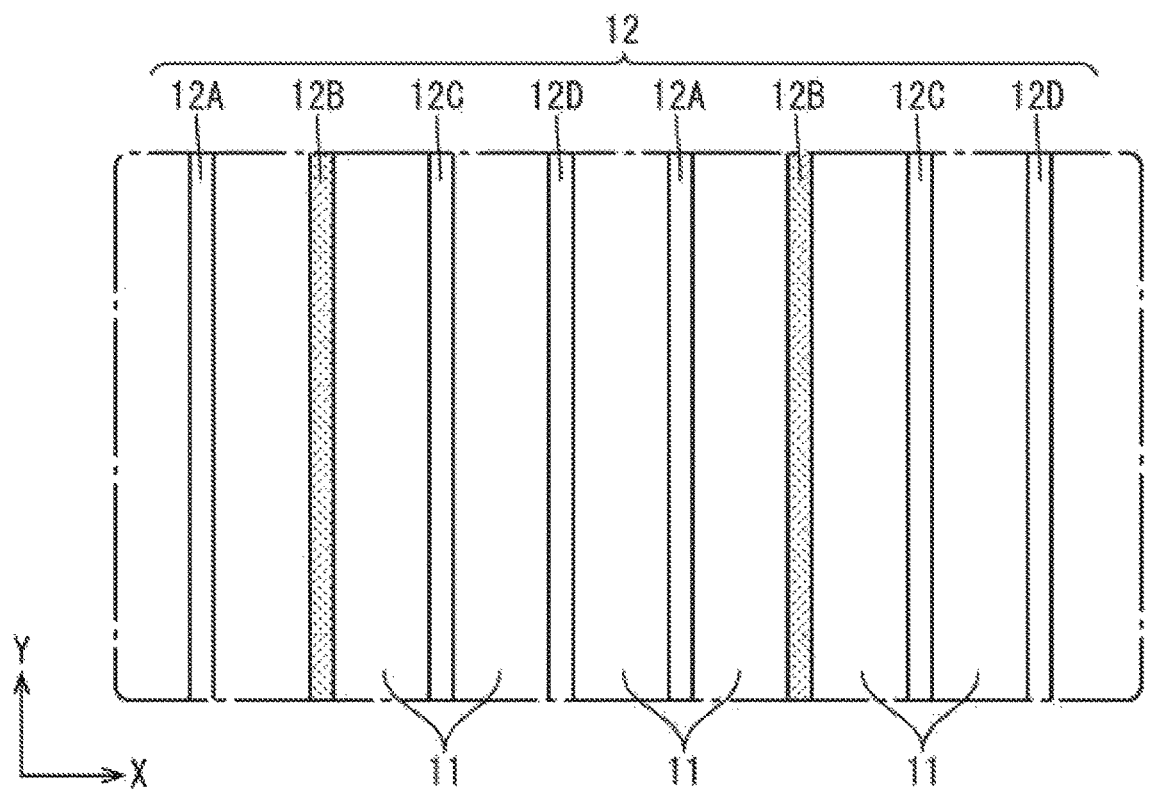
FIG. 9 is a plan view illustrating a portion of the light transmission layers and the electrochromic layers in which the second electrochromic layers are in the light blocking state.

Next, if the one first electrode connecting section 17A and the other second electrode connecting section 18B are supplied with no power and the other first electrode connecting section 17B and the one second electrode connecting section 18A are supplied with power, the first electrodes 15 included in the other first electrode group 15G2 and the second electrodes 16 included in the one second electrode group 16G1 are supplied with power. In this state, among the electrochromic layers 12, voltage is applied to the second electrochromic layers 12B and therefore, the oxidation-reduction reaction is caused and the second electrochromic layers 12B are in the light blocking state, as illustrated in FIG. 9. Among the electrochromic layers 12, voltage is not applied to the first electrochromic layers 12A, the third electrochromic layers 12C, and the fourth electrochromic layers 12D and therefore, the oxidation-reduction reaction is not caused and the first electrochromic layers 12A, the third electrochromic layers 12C, and the fourth electrochromic layers 12D are in the light transmissive state. Namely, the electrochromic layers 12 are arranged such that only the second electrochromic layers 12B that correspond to one fourth of all of the electrochromic layers 12 are in the light blocking state and three electrochromic layers 12A, 12C, 1D that are in the light transmissive state are between the two second electrochromic layers 12B. If the second electrochromic layers 12B are selectively in the light blocking state, light is allowed to pass through an area including four light transmission layers 11 between the second electrochromic layers 12B, and the first electrochromic layer 12A, the third electrochromic layer 12C, and the fourth electrochromic layer 12D that are between the four light transmission layers 11. Therefore, compared to the configuration that a half of all of the electrochromic layers 12 are in the light blocking state as illustrated in FIG. 8, the number of the electrochromic layers 12 that are in the light blocking state is a half and the view angle with respect to the X-axis direction becomes much greater. Compared to the configuration that all of the electrochromic layers 12 are in the light blocking state as illustrated in FIG. 7, the number of the electrochromic layers 12 that are in the light blocking state is one fourth.

Figure 10:
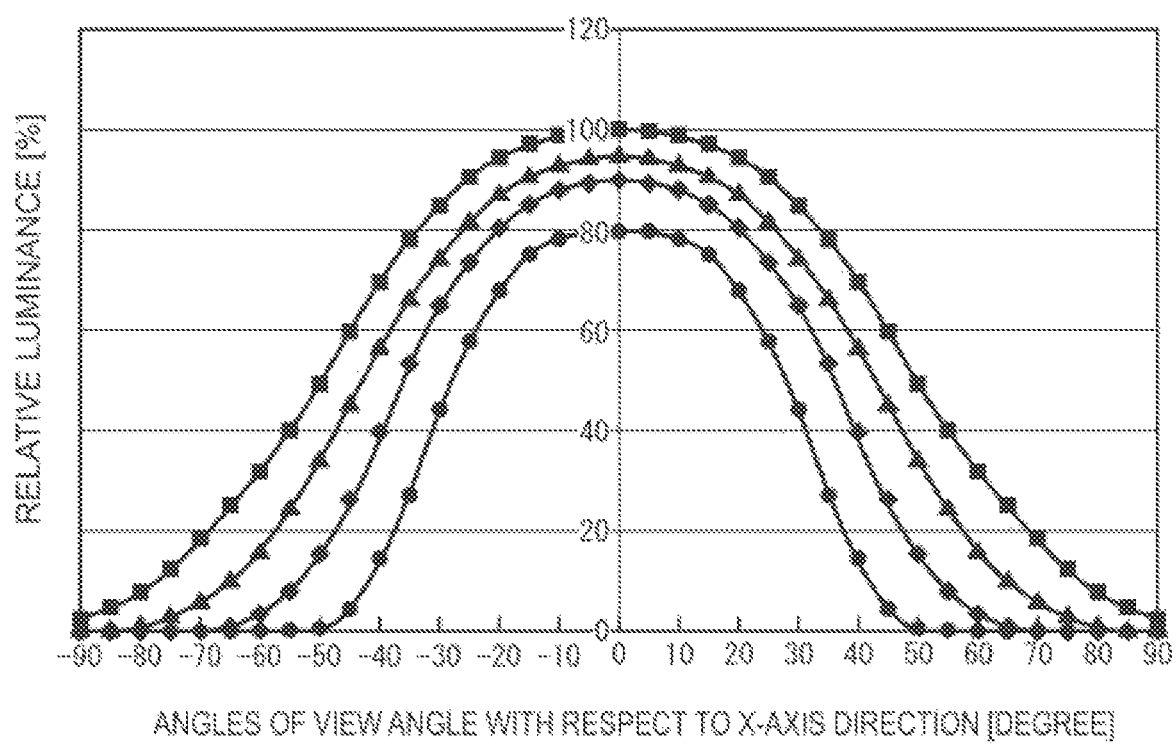
FIG. 10 is a graph representing view angle characteristics of the view angle control sheet.

As described before, according to the view angle control sheet 10 of the present embodiment, any one of the at least four kinds of view angle control patterns A to D illustrated in FIG. 10 can be selected as appropriate when a user sees an image displayed on a display device. FIG. 10 illustrates graphs representing view angle properties of the view angle control sheet 10, and a lateral axis represents angles of the view angle with respect to the X-axis direction (a unit is degree) and a vertical axis represents relative luminance (a unit is %). Regarding a positive sign or a negative sign of the angles with respect to the lateral axis, angles represented on a right side and a left side with respect to the X-axis direction are positive and negative, respectively. A reference value (100%) of the relative luminance with respect to the vertical axis is a luminance value that is obtained when the display device is seen from a front side without any view angle restriction. A view angle control pattern A represents a state in which each of the electrode connecting sections 17, 18 is supplied with no power and a view angle with respect to the X-axis direction is not restricted (see FIG. 6). A view angle control pattern B represents a state in which each of the electrode connecting sections 17, 18 is supplied with power and the view angle with respect to the X-axis direction is smallest (see FIG. 7). A view angle control pattern C represents a state in which the one first electrode connecting section 17A is supplied with no power and other electrode connecting sections 17B, 18A, 18B are supplied with power and the view angle with respect to the X-axis direction is restricted to be smaller than that of the view angle control pattern A and greater than that of the view angel control pattern B (see FIG. 8). A view angle control pattern D represents a state in which the one first electrode connecting section 17A and the other second electrode connecting section 18B are supplied with no power and the other first electrode connecting section 17B and the one second electrode connecting section 18A are supplied with power and the view angle with respect to the X-axis direction is restricted to be smaller than that of the view angle control pattern A and greater than that of the view angel control pattern C (see FIG. 9). The graph illustrated by plotting with "■" in FIG. 10 represents the view angle control pattern A, the graph illustrated by plotting with "●" in FIG. 10 represents the view angle control pattern B, the graph illustrated by plotting with "♦" in FIG. 10 represents the view angle control pattern C, and the graph illustrated by plotting with "▲" in FIG. 10 represents the view angle control pattern D. Thus, in the present embodiment, a most appropriate one of the four kinds of view angle control patterns A to D can be selected according to a user's using situation and the view angle of the image displayed on the display device can be adjusted precisely (with multiple steps). Accordingly, compared to the conventional configuration with only two options of whether the view angle is restricted or not, the view angle can be controlled with wide variations and convenience is improved. Using modes of the display device include a normal using mode in which the view angle is not restricted and a temporary using mode in which the view angle is restricted, and both of the electrodes 15, 16 are supplied with no power in the normal using mode. This is preferable for reducing power consumption.

As described before, the view angle control sheet (the view angle control device) 10 according to the present embodiment includes the light transmission layers 11, the electrochromic layers 12, the first electrodes 15, and the second electrodes 16. The light transmission layers 11 are arranged at intervals and light is transmitted through the light transmission layers 11. The electrochromic layers 12 and the light transmission layers 11 are arranged alternately and the electrochromic layers 12 have light absorption spectrum characteristics according to voltages applied thereto. The first electrodes 15 are disposed on one side of the electrochromic layers 12 to overlap the electrochromic layers 12, respectively, and are contacted with the electrochromic layers 12, respectively. The second electrodes 16 are disposed on an opposite side from the first electrodes 15 with respect to the electrochromic layers 12 to overlap the electrochromic layers 12, respectively, and are contacted with the electrochromic layers 12, respectively.

According to such a configuration, if all of the first electrodes 15 and the second electrodes 16 are supplied with power or no power, the electrochromic layers 12 can be in a high optical absorptance state or a low optical absorptance state. If the optical absorptance of the electrochromic layers 12 is low, the angle of light rays that pass through the light transmission layers 11 is not limited in the arrangement direction of the light transmission layers 11 and the electrochromic layers 12 and therefore, the view angle is not restricted. On the other hand, if the optical absorptance of the electrochromic layers 12 is high, the angle of light rays that pass through the light transmission layers 11 is limited in the arrangement direction and therefore, the view angle is restricted. The first electrodes 15 are arranged to overlap the electrochromic layers 12, respectively. Therefore, the first electrodes 15 are configured such that some of the first electrodes 15 are supplied with power and some of them are supplied with no power and accordingly, the electrochromic layers 12 include those in the high optical absorptance state and those in the low optical absorptance state. If the electrochromic layers 12 are configured to include a large number of electrochromic layers 12 having the high optical absorptance state, the view angle can be controlled to be narrow. If the electrochromic layers 12 are configured to include a large number of electrochromic layers 12 having the low optical absorptance state, the view angle can be controlled to be wide. Thus, the view angle can be adjusted appropriately.

The first electrodes 15 include those included in the first electrode group 15G1 and those included in the first electrode group 15G2. The number of the first electrode connecting sections 17 is same as that of the first electrode groups 15G1, 15G2. The first electrode connecting sections 17 are connected to and short-circuit the first electrodes 15 included in the respective first electrode groups 15G1, 15G2. According to such a configuration, voltage is supplied to the first electrode connecting section 17 so that the first electrodes 15 included in the same first electrode group 15G1 or 15G2 are collectively supplied with power. The number of the first electrode connecting sections 17 is same as that of the first electrode groups 15G1, 15G2. Therefore, it can be selected whether the first electrodes 15 included in each of the first electrode groups 15G1, 15G2 are supplied with power or not by selecting whether or not to supply voltage to each of the first electrode connecting sections 17. Compared to a configuration in which each of the first electrodes 15 is controlled to determine whether or not to be supplied with power, a circuit configuration for controlling power supply to the first electrodes 15 can be simplified.

The first electrode connecting sections 17 are connected to the first electrodes 15 such that the first electrodes 15 that are included in the different first electrode groups 15G1, 15G2 are next to each other. According to such a configuration, the adjacent first electrodes 15 are included in the different first electrode groups 15G1, 15G2. Therefore, if the first electrode connecting sections 17 include one that is supplied with voltage and another one that is supplied with no voltage, the first electrode 15 that is connected to the one first electrode connecting section 17 supplied with voltage and is supplied with power and the first electrode 15 that is connected to the other first electrode connecting section 17 supplied with no voltage and is supplied with no power are arranged next to each other. According to such a configuration, the device can be in the state in which the view angle is restricted and the state in which the view angle is not restricted and also in the state in which the view angle is restricted to be in an intermediate degree between the above two states.

The second electrodes 16 are disposed to overlap the electrochromic layers 12, respectively, and are contacted with the electrochromic layers 12, respectively. According to such a configuration, the electrochromic layers 12 become in the high optical absorptance state or in the low optical absorptance state according to the power supply state where both of the first electrode 15 and the second electrode 16 that are contacted with the same electrochromic layer 12 are supplied with power or at least one of the first electrode 15 and the second electrode 16 that are contacted with the same electrochromic layer 12 is supplied with no power. Therefore, compared to a configuration in which the second electrode 16 is a single electrode that is contacted with all of the electrochromic layers 12, power supply or no power supply to the first electrode 15 and the second electrode 16 that are contacted with the same electrochromic layer 12 can be controlled more precisely.

The second electrodes 16 include those included in the second electrode group 16G1 and those included in the second electrode group 16G2. The number of the second electrode connecting sections 18 is same as that of the second electrode groups 16G1, 16G2. The second electrode connecting sections 18 are connected to and short-circuit the second electrodes 16 included in the respective second electrode groups 16G1, 16G2. According to such a configuration, voltage is supplied to the second electrode connecting section 18 so that the second electrodes 16 included in the same second electrode group 16G1 or 16G2 are collectively supplied with power. The number of the second electrode connecting sections 18 is same as that of the second electrode groups 16G1, 16G2. Therefore, it can be selected whether the second electrodes 16 included in each of the second electrode groups 16G1, 16G2 are supplied with power or not by selecting whether or not to supply voltage to each of the second electrode connecting sections 18. Compared to a configuration in which each of the second electrodes 16 is controlled to determine whether or not to be supplied with power, a circuit configuration for controlling power supply or no power supply to the second electrodes 16 can be simplified.

The first electrodes 15 include those included in the first electrode group 15G1 and those included in the first electrode group 15G2. The number of the first electrode connecting sections 17 is same as that of the first electrode groups 15G1, 15G2. The first electrode connecting sections 17 are connected to and short-circuit the first electrodes 15 included in the respective first electrode groups 15G1, 15G2. The first electrode connecting sections 17 and the second electrode connecting sections 18 are connected to the first electrodes 15 and the second electrodes 16, respectively, with different periodic patterns. According to such a configuration, voltage is supplied to the first electrode connecting section 17 so that the first electrodes 15 included in the same first electrode group 15G1 or 15G2 are collectively supplied with power. The number of the first electrode connecting sections 17 is same as that of the first electrode groups 15G1, 15G2. Therefore, it can be selected whether the first electrodes 15 included in each of the first electrode groups 15G1, 15G2 are supplied with power or not by selecting whether or not to supply voltage to each of the first electrode connecting sections 17. Compared to a configuration in which each of the first electrodes 15 is controlled to determine whether or not to be supplied with power, a circuit configuration for controlling power supply or no power supply to the first electrodes 15 can be simplified. The first electrode connecting sections 17 and the second electrode connecting sections 18 are connected to the first electrodes 15 and the second electrodes 16, respectively, with different periodic patterns. According to such a configuration, the adjacent electrochromic layers 12 may have different combinations of the first electrode groups 15G1, 15G2 and the second electrode groups 16G1, 16G2 that include the first electrode 15 and the second electrode 16 that are contacted with the same electrochromic layer 12. Further, the combination thereof can be made with a periodic pattern. Accordingly, the view angle is controlled with wide variations.

The first electrode connecting sections 17 are connected to the first electrodes 15 such that the first electrode 15 included in the first electrode group 15G1 and one included in the first electrode group 15G2 are next to each other. The second electrode connecting sections 18 are connected to the second electrodes 16 such that the second electrodes 16 included in the same second electrode group 16G1 or 16G2 are arranged next to each other. According to such a configuration, the first electrode connecting sections 17 that are connected to the first electrodes 15 such that the first electrodes 15 included in the different first electrode groups 15G1 and 15G2 are next to each other have a periodic pattern. On the other hand, the second electrode connecting sections 18 are connected to the second electrodes 16 such that the second electrodes 16 included in the same second electrode group 16G1 or 16G2 are arranged next to each other have a periodic pattern that is different from that of the first electrode connecting sections 17.

The electrochromic layers 12 have light absorption spectrum characteristics such that the optical absorptance is increased when power is suppled thereto compared to a case when no power is supplied. Accordingly, when the device is used while the view angle being not restricted, the electrodes 15, 16 are not necessary to be supplied with power. Therefore, if using of the device while restricting the view angle is only temporal, the power consumption can be reduced.

The first substrate 13 and the second substrate 14 are provided. The first electrodes 15 are formed on the plate surface of the first substrate 13 and are sandwiched between at least the electrochromic layers 12 and the first substrate 13. The second electrodes 16 are formed on the plate surface of the second substrate 14 and are sandwiched between at least the electrochromic layers 12 and the second substrate 14. According to such a configuration, in the producing, the first electrodes 15 are formed on the plate surface of the first substrate 13 and the second electrodes 16 are formed on the plate surface of the second substrate 14 and then, the first substrate 13 and the second substrate 14 are disposed to sandwich the electrochromic layers 12 and the light transmission layers 11 therebetween. The first electrodes 15 and the second electrodes 16 are formed easily and the first electrodes 16 are positioned corresponding to the respective electrochromic layers 12 easily and therefore, the productivity is preferably improved.

Second Embodiment

Figure 12:
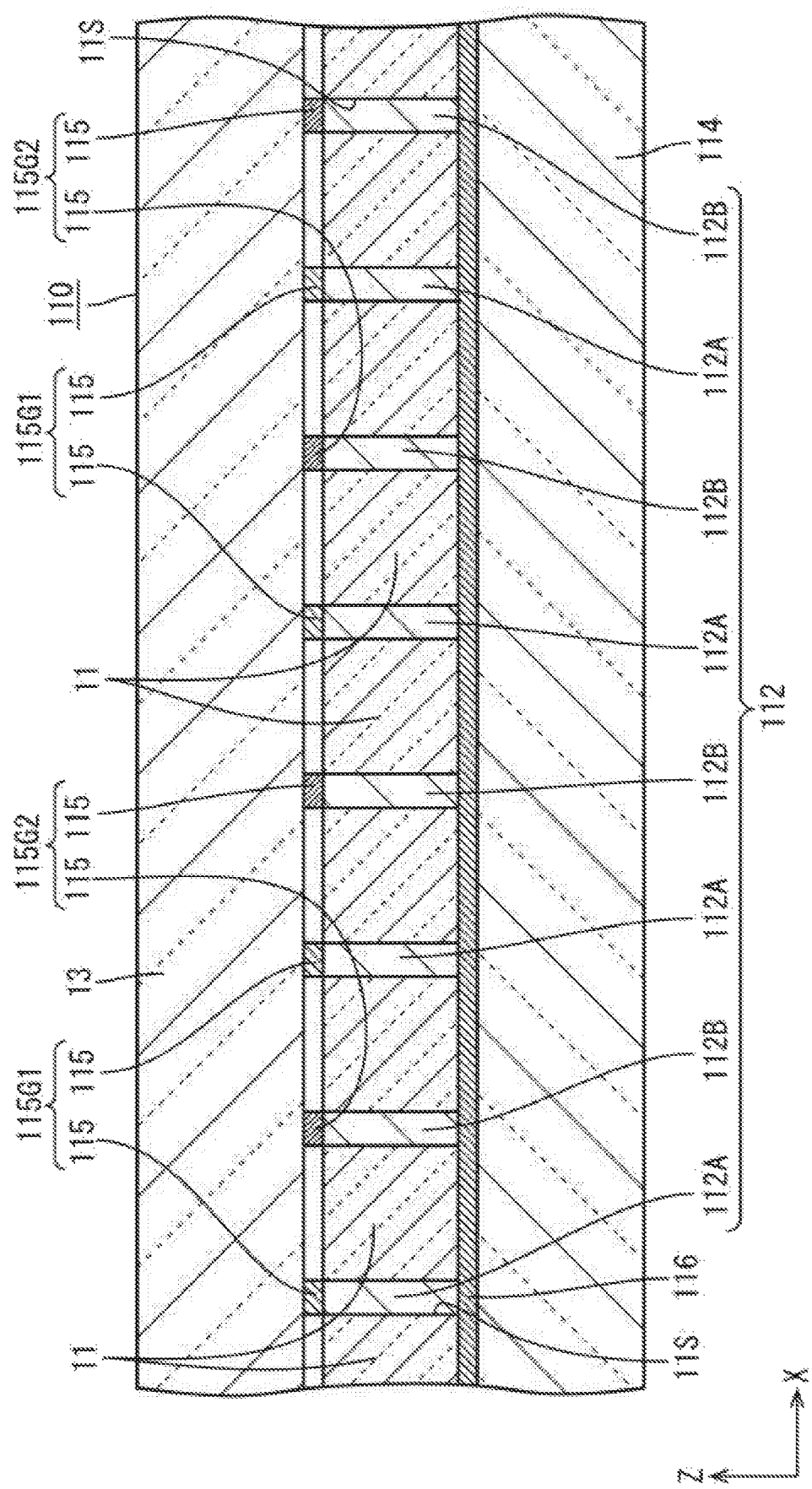
FIG. 12 is a cross-sectional view of the view angle control sheet.
Figure 13:
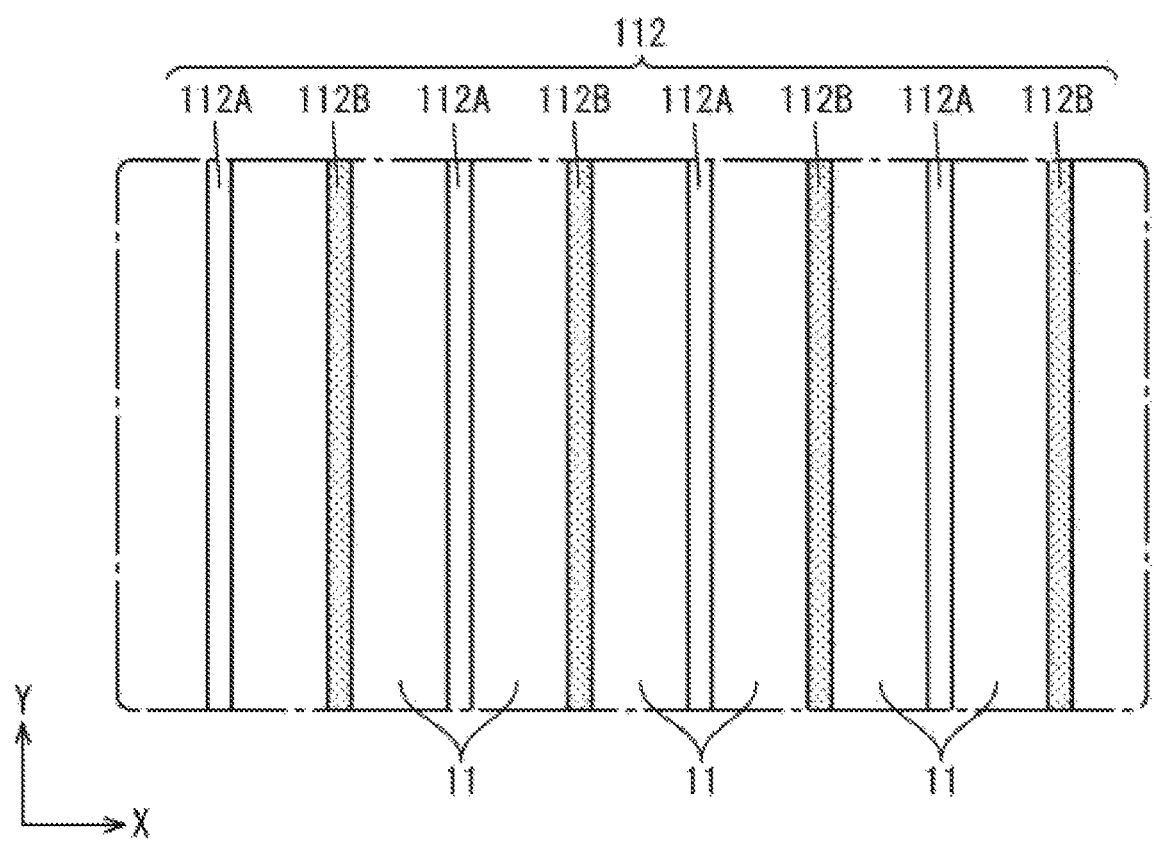
FIG. 13 is a plan view illustrating a portion of light transmission layers and electrochromic layers in which second electrochromic layers are in the light blocking state.

A second embodiment will be described with reference to FIGS. 11 to 13. The second embodiment includes a second substrate 114 having a different configuration. Configurations, functions, and effects similar to those of the first embodiment will not be described.

Figure 11:
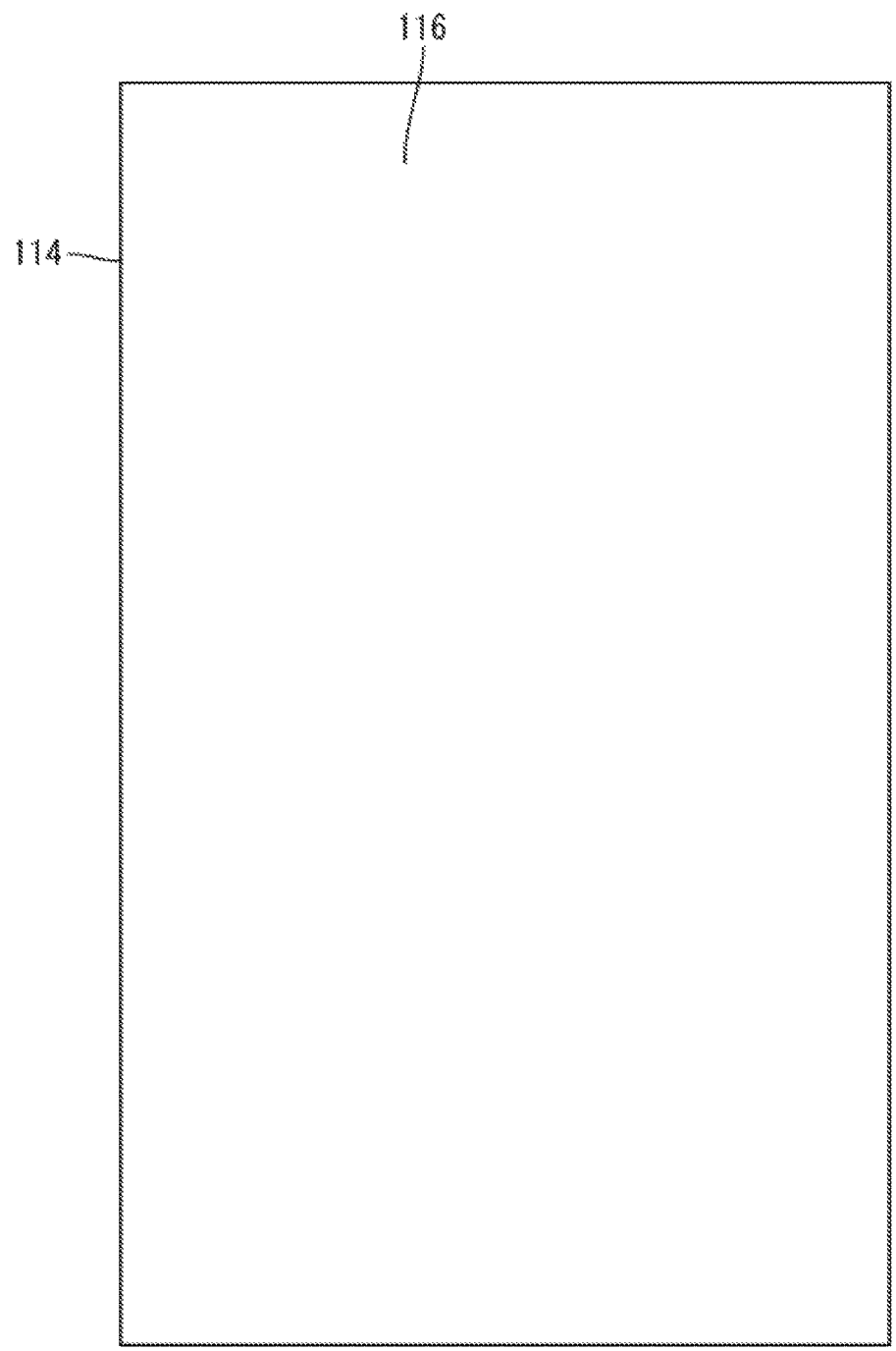
FIG. 11 is a plan view of a second substrate included in a view angle control sheet according to a second embodiment.

As illustrated in FIG. 11, a second electrode 116 is disposed in a solid manner over a substantially entire area of a plate surface of the second substrate 114 according to the present embodiment. According to such a configuration, the present embodiment does not include the second electrode groups 16G1, 16G2 (refer FIG. 4) that are described in the first embodiment section and does not include the second electrode connecting sections 18 (refer FIG. 4). As illustrated in FIG. 12, the second electrode 116 formed in a solid pattern extends in the X-axis direction over electrochromic layers 112 that are arranged in the X-axis direction and is in contact with back surfaces of all of the electrochromic layers 112. According to such a configuration, the electrochromic layers 112 include first electrochromic layers 112A and second electrochromic layers 112B. The first electrochromic layers 112A are sandwiched between the first electrodes 115, which are included in one first electrode group 115G1, and the second electrode 116. The second electrochromic layers 112B are sandwiched between the first electrodes 115, which are included in another first electrode group 115G2, and the second electrode 116. The first electrochromic layers 112A and the second electrochromic layers 112B are arranged alternately in the X-axis direction. Accordingly, the present embodiment does not include the third electrochromic layers 12C and the fourth electrochromic layers 12D (refer FIG. 5) that are described in the first embodiment section.

In a view angle control sheet 110, as described in the first embodiment section, it can be selected whether all of the electrodes 115, 116 are supplied with power or not, and also it can be selected that a half number of the first electrodes 115 are supplied with no power and the another half number of the first electrodes 115 and the second electrode 116 are supplied with power. For example, one of the two first electrode connecting sections is not supplied with power and another one of the two first electrode connecting sections is supplied with power so that the first electrodes 115 included in the one electrode connecting section 115G1 are not supplied with power and the first electrodes 115 included in the other first electrode group 115G2 and the second electrode 116 are supplied with power. In such a configuration, as illustrated in FIG. 13, among the electrochromic layers 112, the first electrochromic layers 112A are not supplied with voltage and maintained in the light transmissive state and the second electrochromic layers 112B are supplied with voltage and the oxidation-reduction reaction is caused and the second electrochromic layers 112B become in the light blocking state. In FIG. 13, the first electrochromic layers 112A and the second electrochromic layers 112B that are in the light blocking state are illustrated with shading. The electrochromic layers 112 are arranged such that the electrochromic layers 112 to become in the light blocking state and those to become in the light transmissive state are arranged alternately and the electrochromic layer 112A to become in the light transmissive state is disposed between the two electrochromic layers 112B to become in the light blocking state. Such arrangement is same as that of the view angle control pattern C described in the first embodiment section. As described before, according to the view angle control sheet 110 of the present embodiment, any one of the three kinds of view angle control patterns A to C can be selected as appropriate when a user sees an image displayed on the display device. Therefore, compared to the conventional configuration with only two options of whether the view angle is restricted or not, the view angle can be controlled with wide variations and convenience is improved. Opposite to the configuration in FIG. 13, the other first electrode connecting section may be supplied with no power and the one first electrode connecting section may be supplied with power so that the first electrochromic layers 112A can be made in the light blocking state and the second electrochromic layers 112B can be made in the light transmissive state. In such a case, the view angle can be controlled similarly to the view angle control pattern C of the first embodiment.

As described before, according to the present embodiment, the second electrode 116 extends over the electrochromic layers 112 and is contacted with the electrochromic layers 112. According to such a configuration, an electrode structure of the second electrode 116 becomes simple compared to a configuration including multiple second electrodes 116 similar to the first electrodes 115. Accordingly, the second electrode 116 can be produced easily.

Third Embodiment

A third embodiment will be described with reference to FIG. 14 or FIG. 15. The third embodiment includes a first electrode driving section 19 in addition to the configuration of the second embodiment. Configurations, functions, and effects similar to those of the second embodiment will not be described.

Figure 14:
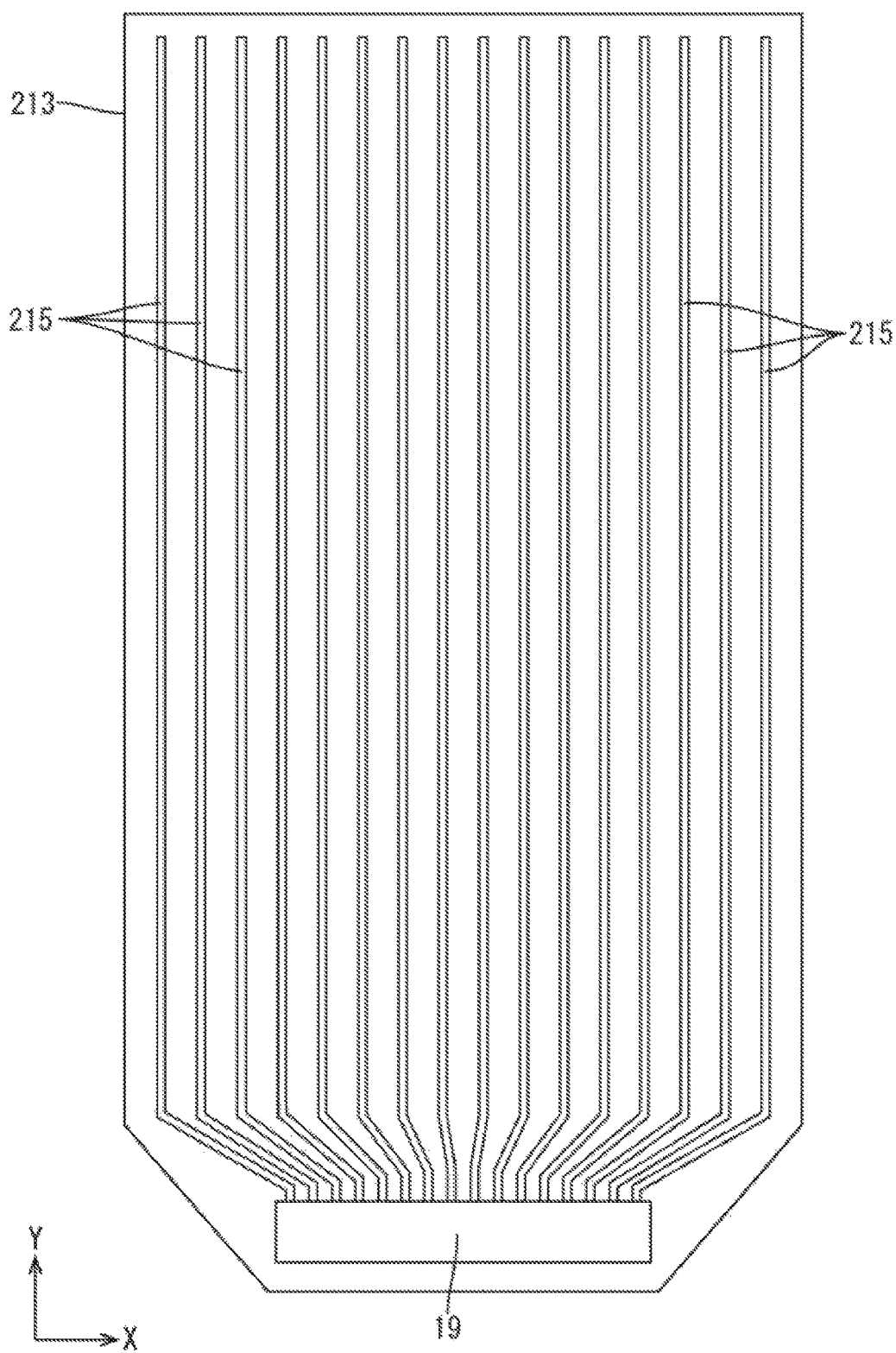
FIG. 14 is a bottom view of a first substrate included in a view angle control sheet according to a third embodiment.
Figure 15:
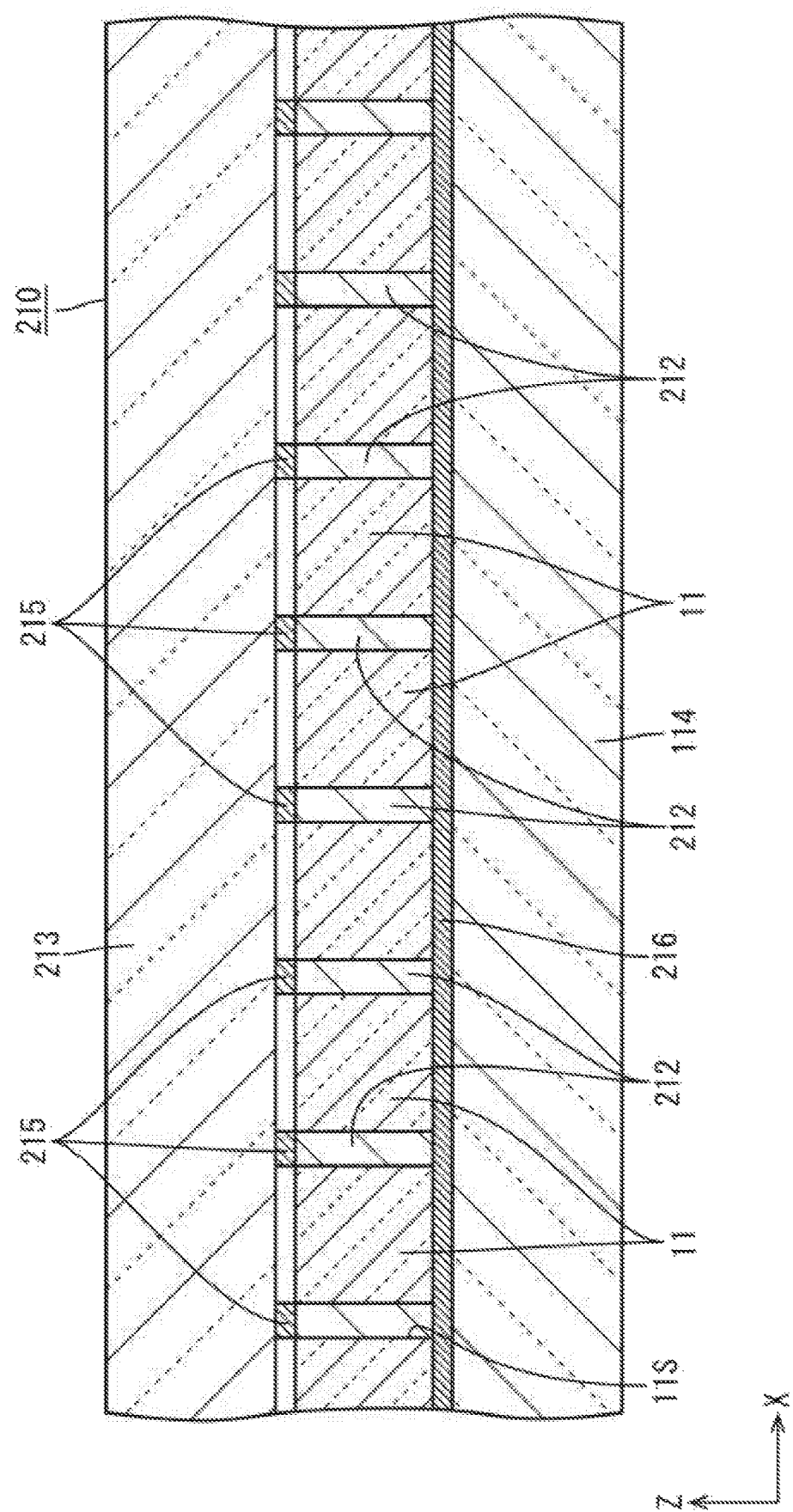
FIG. 15 is a cross-sectional view of the view angle control sheet.

As illustrated in FIG. 14, a first substrate 213 of a view angle control sheet 210 according to the present embodiment includes the first electrode driving section 19 that is connected to first electrodes 215 and can supply power to each of the first electrodes 215 independently. The first electrode driving section 19 is mounted on an extended portion that is extended from one edge of the first substrate 213 with respect to the Y-axis direction. The first electrode driving section 19 is a LSI chip that includes a drive circuit therein and is activated based on signals supplied from a signal supply source to selectively drive the first electrodes 215. Specifically, in the present embodiment, the first electrode driving section 19 is configured to supply or not to supply power to all of the first electrodes 215 collectively and also configured to selectively supply power to any ones of the first electrodes 215 and not to supply power to the rest of the first electrodes 215. A second electrode 216 is preferably controlled to be always supplied with power except for the case in which all of the first electrodes 215 are not supplied with power (if at least one first electrode 215 is supplied with power). Accordingly, any ones of electrochromic layers 212 illustrated in FIG. 15 can be selectively made in the light blocking state and the rest of the electrochromic layers 212 can be made in the light transmissive state. Therefore, according to the present embodiment, the number of kinds of view angle control patterns can be greater than that of the first embodiment, and the view angle of an image displayed on the display device can be adjusted more precisely. In other words, the number of steps for adjusting the view angle of the image displayed on the display device can be increased. Accordingly, the variation in controlling a view angle is increased and the convenience is improved. The present embodiment does not include the first electrode groups 15G1, 15G2 of the first embodiment (refer FIG. 3) and does not include the first electrode connecting sections 17 (refer FIG. 3). In the present embodiment, all of the electrochromic layers 212 correspond to the first electrochromic layers 12A of the first embodiment (refer FIG. 3) and no second electrochromic layers 12B (refer FIG. 3) are included.

As described before, the present embodiment includes the first electrode driving section 19 that is connected to each of the first electrodes 215 and can supply power to the first electrodes 215 separately. Accordingly, a specific one of the first electrodes 215 can be supplied with power and the rest of the first electrodes 215 are not supplied with power by the first electrode driving section 19. The variation in controlling a view angle is further increased.

Other Embodiments

The present technology is not limited to the embodiments described in the above descriptions and drawings. The following embodiments may be included in the technical scope.

(1) In the first embodiment, the first electrodes and the second electrodes are divided into two electrode groups, respectively; however, the first electrodes and the second electrodes may be divided into three groups or more, respectively. In such a configuration, three or more first electrode connecting sections and three or more second electrode connecting section may be provided.

(2) In the first and second embodiments, the first electrodes included in the one first electrode group and the first electrodes included in the other first electrode group are arranged alternately one by one; however, the first electrodes may be arranged such that the first electrodes included in the one first electrode group are arranged next to each other and subsequently the first electrodes included in the other first electrode group may be arranged next to each other.

(3) In the first embodiment, every two of the second electrodes included in the one second electrode group and every two of the second electrodes included in the other second electrode group are alternately arranged; however, the second electrodes may be arranged such that three or more second electrodes included in the one second electrode group may be arranged next to each other and subsequently three or more second electrodes included in the other second electrode group may be arranged next to each other. Other than that, the second electrodes included in the one second electrode group and the second electrodes included in the other second electrode group may be alternately arranged one by one.

(4) In the second embodiment, the first electrodes are divided into two electrode groups; however, the first electrodes may be divided into three or more electrode groups. In such a configuration, three or more first electrode connecting section may be included.

(5) In the second embodiment, the second electrode is disposed in a solid manner; however, multiple second electrodes may be disposed similarly to the first embodiment and the first electrode may be disposed in a solid manner.

(6) In the first and second embodiments, the first connecting sections and the second connecting sections are connected to the first electrodes and the second electrodes, respectively, so as to have different periodic patterns; however, the first electrode connecting sections and the second connecting sections may be connected to the first electrodes and the second electrodes, respectively, so as to have a same periodic pattern.

(7) The third embodiment is configured to include the second electrode formed in a solid pattern as is in the second embodiment; however, the third embodiment may include multiple second electrodes similarly to the first embodiment.

(8) As a modification of the above (7), a second electrode driving section may be further disposed on the second substrate on which the second electrodes are arranged, and the second electrode driving section is connected to each of the first electrodes and configured to control the first electrodes independently. According to such a configuration, supply of power or no supply of power to the first electrodes and the second electrodes can be selected more freely with the first electrode driving section and the second electrode driving section. Therefore, the view angle for an image displayed on the display device can be adjusted with a greater number of steps.

(9) In each of the above embodiments, the view angle control sheet has a flat plate surface. If a display panel of a display device that includes the view angle sheet has a curved display surface, a plate surface of the view angle control sheet may be preferably curved along the display surface. In such a case, the first substrate and the second substrate that are included in the view angle control sheet may be preferably made of synthetic resin material to provide them with flexibility. Other than that, the first substrate and the second substrate that are included in the view angle control sheet may be made of glass to provide them with flexibility by adjusting thickness thereof.

(10) Each of the above embodiments includes the electrochromic layers that are substantially transparent when supplied with no power; however, electrochromic layers that do not become transparent but become in a bright color (brighter than a color when supplied with power) may be used.

(11) Each of the above embodiments includes the electrochromic layers that become black when supplied with power; however, electrochromic layers that become in a dark color other than black (darker than a color when supplied with no color) may be used. Electrochromic layers that are not colored but become opaque when supplied with power may be used.

(12) In each of the above embodiments, the electrochromic layers have the light absorption spectrum characteristics such that the optical absorptance is increased when power is supplied thereto compared to a case when no power is supplied; however, the electrochromic layers may have light absorption spectrum characteristics such that the optical absorptance is increased when no power is supplied thereto compared to a case when power is supplied.

(13) Other than each of the above embodiments, specific electrochromic material used for the electrochromic layers may be altered as appropriate. Specific material used for the light transmission layers and each electrode may be also altered as appropriate.

(14) Other than each of the above embodiments, specific values of various dimensions of the light transmission layers, the electrochromic layers, the first electrodes, and the second electrodes may be altered as appropriate. For example, the width dimensions of the first electrode, the second electrode, and the electrochromic layer may not be necessarily the same. The width dimensions of the first electrode and the second electrode may not be necessarily the same.

(15) In each of the above embodiments, the view angle control sheet is used in combination with the display device; however, the view angle control sheet may be used in other devices as appropriate.

The invention claimed is:

1. A view angle control device comprising:
light transmission layers that are arranged at intervals in a first direction and through which light passes;
electrochromic layers having light absorption spectrum characteristics according to voltages applied thereto, the electrochromic layers and the light transmission layers being formed at a same layer level and arranged alternately in the first direction;
first electrodes arranged at intervals and disposed on one side with respect to the electrochromic layers and arranged to be overlapped with the electrochromic layers and contacted with the electrochromic layers, respectively; and
second electrodes arranged at intervals and disposed on an opposite side from the first electrodes with respect to the electrochromic layers and arranged to be overlapped with and contacted with the electrochromic layers, respectively.

2. The view angle control device according to claim 1, wherein the first electrodes include first group first electrodes and second group first electrodes, and the view angle control device further comprising:
a first connecting section connected to the first group first electrodes; and
a second connecting section connected to the second group first electrodes.

3. The view angle control device according to claim 2, wherein the first group first electrodes and the second group first electrodes are arranged alternately in the first direction.

4. The view angle control device according to claim 2, wherein the second electrodes include first group second electrodes and second group second electrodes, and the view angle control device further comprising:
a third connecting section connected to the first group second electrodes; and
a fourth connecting section connected to the second group second electrodes.

5. The view angle control device according to claim 4, wherein the first group second electrodes and the second group second electrodes are arranged in a different arrangement pattern from that of the first group first electrodes and the second group first electrodes.

6. The view angle control device according to claim 5, wherein
the first group first electrodes and the second group first electrodes are arranged alternately in the first direction, and
the first group second electrodes and the second group second electrodes are arranged in the first direction such that at least two of the first group second electrodes are arranged next to each other.

7. The view angle control device according to claim 4, wherein
the first electrodes extend in a second direction that is perpendicular to the first direction and include first ends and second ends that are opposite ends from the first ends,
the first ends of the first group first electrodes are connected to the first connecting section and the second ends of the second group first electrodes are connected to the second connecting section,
the second electrodes extend in the second direction and include first ends and second ends that are opposite ends from the first ends of the second electrodes, and
the first ends of the first group second electrodes are connected to the third connecting section and the second ends of the second group second electrodes are connected to the fourth connecting section.

8. The view angle control device according to claim 7, wherein the first group second electrodes and the second group second electrodes are arranged in a different arrangement pattern from that of the first group first electrodes and the second group first electrodes.

9. The view angle control device according to claim 8, wherein
the first group first electrodes and the second group first electrodes are arranged alternately in the first direction, and
the first group second electrodes and the second group second electrodes are arranged in the first direction such that at least two of the first group second electrodes are arranged next to each other.

10. The view angle control device according to claim 2, wherein
the first electrodes extend in a second direction that is perpendicular to the first direction and include first ends and second ends that are opposite ends from the first ends, and
the first ends of the first group first electrodes are connected to the first connecting section and the second ends of the second group first electrodes are connected to the second connecting section.

11. The view angle control device according to claim 1, wherein the second electrodes include first group second electrodes and second group second electrodes, and the view angle control device further comprising:
a third connecting section connected to the first group second electrodes; and
a fourth connecting section connected to the second group second electrodes.

12. The view angle control device according to claim 11, wherein
the second electrodes extend in a second direction that is perpendicular to the first direction and include first ends and second ends that are opposite ends from the first ends, and
the first ends of the first group second electrodes are connected to the third connecting section and the second ends of the second group second electrodes are connected to the fourth connecting section.

13. The view angle control device according to claim 1, wherein the electrochromic layers include electrochromic material that have light absorption spectrum characteristics such that optical absorptance is increased when power is supplied thereto compared to a case when no power is supplied.

14. The view angle control device according to claim 1, further comprising:
a first substrate having a plate surface on which the first electrodes are disposed, the first substrate and at least the electrochromic layers sandwiching the first electrodes therebetween; and
a second substrate having a plate surface on which the second electrodes are disposed, the second substrate and at least the electrochromic layers sandwiching the second electrodes therebetween.

15. The view angle control device according to claim 1, wherein
the electrochromic layers have a first width measured in the first direction,
the first electrodes have a second width measured in the first direction,
the second electrodes have a third width measured in the first direction, and
the first width, the second width, and the third width are same.

16. The view angle control device according to claim 1, wherein the light transmission layers are made of transparent synthetic resin.

17. A view angle control device comprising:
light transmission layers that include transparent synthetic resin material and through which light passes, the light transmission layers being separated from each other and arranged at intervals in a first direction;
electrochromic layers including electrochromic material that have light absorption spectrum characteristics according to voltages applied thereto, the electrochromic layers being separated from each other, the electrochromic layers and the light transmission layers being formed at a same layer level and arranged alternately in the first direction;
first electrodes arranged at intervals and disposed on one side with respect to the electrochromic layers and arranged to be overlapped with the electrochromic layers and contacted with the electrochromic layers, respectively; and
a second electrode arranged at intervals and disposed on an opposite side from the first electrodes with respect to the electrochromic layers and arranged to be overlapped with and contacted with the electrochromic layers.

18. The view angle control device according to claim 17, wherein the second electrode extends over the electrochromic layers and is contacted with the electrochromic layers.

19. The view angle control device according to claim 17, further comprising a first electrode driving section connected to the first electrodes and configured to supply power to each of the first electrodes independently.

20. The view angle control device according to claim 17, wherein
the electrochromic layers have a first width measured in the first direction,
the first electrodes have a second width measured in the first direction, and
the first width and the second width are same.

21. The view angle control device according to claim 17, wherein the first electrodes include first group first electrodes and second group first electrodes, and the view angle control device further comprising:
a first connecting section connected to the first group first electrodes; and
a second connecting section connected to the second group first electrodes.

22. The view angle control device according to claim 21, wherein the first group first electrodes and the second group first electrodes are arranged alternately in the first direction.

23. The view angle control device according to claim 21, wherein
the first electrodes extend in a second direction that is perpendicular to the first direction and include first ends and second ends that are opposite ends from the first ends, and
the first ends of the first group first electrodes are connected to the first connecting section and the second ends of the second group first electrodes are connected to the second connecting section.

24. The view angle control device according to claim 17, wherein the light transmission layers are made of transparent synthetic resin.

* * * * *